tented Aug. 14, 1951

2,564,102

UNITED STATES PATENT OFFICE 2,564,102

MUCONONITRILE

Frank S. Fawcett and Carl M. Langkammerer, Wilmington, Del., assignors to E. I. du Pont de Nemours & Company, Wilmington, Del., a corporation of Delaware No Drawing. Application March 20, 1950,
Serial No. 150,795

3 Claims. (Cl. 260—465.8)

This invention relates to mucononitrile, a new and highly unsaturated compound having the formula $N{\equiv}C{-}CH{=}CH{-}CH{=}CH{-}C{\equiv}N$, and a process for its preparation.

An object of the invention is to provide a new, unsaturated dinitrile in which the unsaturation is fully conjugated. Another object is to provide a process for the preparation of mucononitrile. Other objects of the invention will appear hereinafter.

Mucononitrile is prepared by the dehydrohalogenation of a 3,4-dihaloadiponitrile, e. g. 3,4-dibromoadiponitrile. This is conveniently carried out by heating 3,4-dibromoadiponitrile to reaction temperature, preferably in the range of 75 to 150° C., in an inert solvent with sufficient silver acetate or silver oxide to furnish one equivalent (atom) of silver for each equivalent of bromine in the dibromoadiponitrile. The mucononitrile is obtained as a mixture of geometric isomers from which an isomer, presumably the trans, trans-form, melting at 160–162° C. and a mixture of isomers melting over the range 52–108° C. can be isolated as shown in the subsequent example. Theoretically, mucononitrile can exist in three geometric isomeric forms as follows:

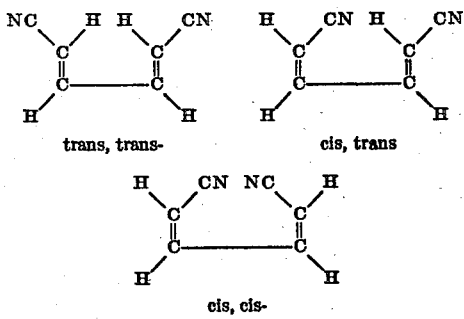

The following example, in which parts are given by weight, illustrates the preparation and characterization of mucononitrile.

EXAMPLE

A mixture of 54 parts of 3,4-dibromoadiponitrile (conveniently prepared by the addition of bromine to 1,4-dicyano-2-butene and obtained as a white crystalline solid, M. P. 124.5–125° C. (dec.); Anal. calcd. for $C_6H_6N_2Br_2$: Br, 59.8; found: Br, 59.94), 66 parts of silver acetate, and 105 parts of glacial acetic acid was stirred and heated on a steam bath. A yellow solid gradually appeared and, after 10 minutes of heating, the reaction became sufficiently active to cause boiling for 1 to 2 minutes, after which the reaction subsided. The reaction mixture was heated with stirring for an additional 10 minutes, and was then cooled and filtered. The filtrate was diluted with 300 parts of water, whereupon 3.7 parts of a high melting mucononitrile (M. P. 160–162° C.) separated in the form of colorless needles, which were isolated by filtration. On evaporating the clear filtrate to dryness, a solid residue of 12 parts of a lower melting mucononitrile, M. P. 52–108° C., was obtained.

Anal. calcd. for: $C_6H_4N_2$: C, 69.20; H, 3.87; N, 26.90.

Found for higher melting product: C, 69.36, 69.59; H, 4.16, 3.98; N, 26.96, 26.98.

Found for lower melting product: C, 68.32; H, 3.47; N, 26.62.

Samples of each of the above mucononitriles were hydrogenated using a palladium-on-carbon catalyst. Two moles of hydrogen were absorbed in each case with the formation of adiponitrile. The adiponitrile was identified by its physical properties and by hydrolysis to adipic acid, which in turn was identified by its melting point (M. P.) and neutralization equivalent (N. E.).

ANALYTICAL DATA

Hydrogenation of mucononitrile

| M. P. of mucononitrile used | $H_2$ absorbed in grams per gram sample | $n_D^{25}$ product formed [1] |
|---|---|---|
| ° C. | | |
| 160–162 | 0.0396 | 1.4371 |
| 52–108 | 0.0377 | 1.4373 |

[1] $n_D^{25}$ for authentic sample of adiponitrile was 1.4360.

Hydrolysis of hydrogenated product

| M. P. of mucononitrile hydrogenated | N. E. of hydrolysis product | M. P. of hydrolysis product | Mixed M. P. with known sample of adipic acid [2] |
|---|---|---|---|
| ° C. | | ° C. | ° C. |
| 160–162 | 74.0 | 151–153 | 151–153.5 |
| 52–108 | 73.2 | 150–153 | 151–154 |

[2] M. P. for authentic sample, 151–153.5° C.; neutral equivalent (calcd.), 73.1.

On hydrolysis with aqueous hydrochloric acid each of the above-mentioned forms of mucononitrile formed muconic acid, which was identified by neutral equivalent, melting point, and mixed melting point with an authentic sample of muconic acid.

In place of the 3,4-dibromoadiponitrile used in the foregoing example, one may employ 3,4-dichloroadiponitrile or 3,4-diiodoadiponitrile. Other dehydrohalogenating agents that can be used in place of silver acetate or silver oxide are aliphatic tertiary amines, pyridine, alkali metal hydroxides, polyquaternary ammonium hydroxides, and polyamines, including polyamine exchange resins.

Mucononitrile is a very active compound. It undergoes Diels-Alder type condensation with active dienophiles. As indicated in the foregoing example, it can be hydrogenated to adiponitrile, which in turn can be converted to hexamethylenediamine by known methods. As further indicated in the example, mucononitrile can be converted to muconic and adipic acids which are useful in the preparation of polyesters and polyamides.

Mucononitrile can also be used in the preparation of polymeric materials. For example, when a solution of 2 parts of mucononitrile (M. P. 52–108° C.), 2 parts of styrene, and 0.02 part of alpha,alpha'-azodiisobutyronitrile in 18 parts of benzene was heated in an atmosphere of nitrogen at 60° C. for 15 hours, 0.5 part of a benzene-insoluble resinous material was formed. Analysis of this resinous material, after trituration with methanol, showed it to be a copolymer of mucononitrile and styrene in a 1:1 ratio. Thus it was found to contain 13.43% nitrogen, whereas polymucononitrile contains 26.9% nitrogen and polystyrene contains none. The molecular weight of the copolymer, as determined by the boiling point method in acetone solution, was 3000. The copolymer was useful in the preparation of adhesive and coating compositions.

Mucononitrile can also be copolymerized with other polymerizable materials, for example, isobutylene, acrylonitrile, vinyl acetate, methyl methacrylate, butadiene, and chloroprene. Suitable polymerization catalysts include azonitriles of the type disclosed in the Madison Hunt, U. S. Patent 2,471,959; peroxides, such as benzoyl peroxide; and persulfates, such as ammonium persulfate.

We claim:

1. A mucononitrile having the formula:

$$N \equiv C-CH=CH-CH=CH-C \equiv N$$

2. A mucononitrile having the formula:

$$N \equiv C-CH=CH-CH=CH-C \equiv N$$

and a melting point between 160 and 162° C.

3. A mucononitrile having the formula:

$$N \equiv C-CH=CH-CH=CH-C \equiv N$$

and a melting point between 52 and 108° C.

FRANK S. FAWCETT.
CARL M. LANGKAMMERER.

REFERENCES CITED

The following references are of record in the file of this patent:

UNITED STATES PATENTS

| Number | Name | Date |
|---|---|---|
| 2,232,785 | Howk | Feb. 25, 1941 |
| 2,342,101 | Cass et al. | Feb. 22, 1944 |
| 2,439,308 | Leekley | Apr. 6, 1948 |
| 2,485,225 | Webb | Oct. 18, 1949 |

OTHER REFERENCES

Heilbron: "Dict. of Org. Compds" (Oxford), vol. II, p. 641 (1936).